3,149,011
PROPELLANT COMPOSITIONS CONTAINING NITROALKANE, ETHER AND PERCHLORATE

James W. Vogh, Lake Jackson, Tex., assignor to The Dow Chemical Company, Midland, Mich., a corporation of Delaware
No Drawing. Filed July 6, 1961, Ser. No. 122,117
11 Claims. (Cl. 149—75)

This invention relates to new chemical compositions having valuable utility as single phase liquid rocket propellants.

The novel compositions of the present invention consist essentially of from about 30 to about 60 weight percent of an inorganic perchlorate, from about 5 to about 30 weight percent of an ether, and from about 20 to about 60 weight percent of a nitroalkane having from 1 to 5 carbon atoms in the alkyl group.

Nitroalkanes are known rocket fuels and have been used as combination fuel-oxidizers. However, the use of nitroalkanes as rocket fuels has shown that if their burning ceases prematurely, they frequently will not re-ignite. The presence of one of the perchlorates previously disclosed serves to correct this difficulty, the perchlorate serving as an oxidizer and thereby aiding re-ignition of the propellant. Finally, the ether is an effective solvent for the inorganic perchlorate-nitroalkane system and also serves as a fuel. The resultant composition of these three components is a useful single phase liquid rocket propellant. In addition, the presence of the components in the proportions previously described results in a balanced fuel-oxidizer system.

The perchlorate employed may be any inorganic perchlorate that is soluble in the ether-nitroalkane mixture; magnesium perchlorate is very soluble in the ether-nitroalkane system, and thus is a preferred species. The ether used in the novel composition is one having the formula:

R—O—R' wherein R and R' are each either alkyl radicals having from 1 to 4 carbon atoms or alkoxyalkyl groups having from 1 to 4 carbon atoms in each of the alkyl and alkoxy portions of said groups. Specific examples of the ethers described above include diethyl ether, 2,2-dimethoxypropane, ethylene glycol dimethyl ether, and diethylene glycol dimethyl ether.

The use of a single phase propellant composition containing both fuel and oxidizer is preferable to one where the fuel and oxidizer are kept in separate storage tanks; the latter system has accompanying problems in valving and metering the components in proper proportions into the combustion chamber.

The novel compositions are normally liquid at ambient temperatures and usually must be cooled to substantially below 0° C. to effect solidification. The compositions are conveniently prepared by dissolving the perchlorate in an ether-nitroalkane mixture or by adding the ether to a perchlorate-nitroalkane slurry. Ignition of the compositions is effected by conventional methods practiced in the liquid propellant art, and upon ignition, the compositions burn with flashes of white flame, leaving a solid residue.

A series of compositions, each containing magnesium perchlorate and an ether and a nitroalkane of the respective genera previously disclosed, were prepared and contained the proportions of components, in weight percent, as shown in Table I.

Table I

| Composition | $Mg(ClO_4)_2$ | Ether, Percent | Nitroalkane, Percent |
|---|---|---|---|
| I | 38.0 | 2,2-dimethoxypropane—5.0. | Nitromethane—57.0. |
| II | 43.4 | 2,2-dimethoxypropane—6.8. | Nitromethane—49.8. |
| III | 48.8 | 2,2-dimethoxypropane—15.3. | Nitromethane—35.9. |
| IV | 36.4 | Ethylene glycol dimethyl ether—7.7. | Nitromethane—55.8. |
| V | 41.6 | Ethylene glycol dimethyl ether—11.7. | Nitromethane—46.7. |
| VI | 56.7 | Ethylene glycol dimethyl ether—21.7. | Nitromethane—21.6. |
| VII | 32.3 | Diethylene glycol dimethyl ether—11.0. | Nitromethane—56.7. |
| VIII | 34.6 | Diethyl ether—13.2 | Nitromethane—52.2. |
| IX | 44.8 | 2,2-dimethoxypropane—12.1. | 2-nitropropane—43.2. |
| X | 48.9 | 2,2-dimethoxypropane—26.6. | 2-nitropropane—24.6. |
| XI | 42.2 | Ethylene glycol dimethyl ether—17.5. | 2-nitropropane—40.3. |

Compositions I–XI shown in Table I were stored for eight weeks at room temperature in the absence of air and water and showed no evidence of decomposition. All ignited readily and burned rapidly without detonation.

In an actual example, an alumina tube 15" long and having a ⅜" internal diameter was wrapped with nichrome wire starting at one end and extending 7", and the wrapped section was then covered with insulation. Heat was then applied to the insulated end until the tube became red, as viewed from the other end of the tube behind a safety shield. A small sample of Composition I was introduced into the heated end of the tube and ignited almost instantaneously. The sample burned with a white flame for several seconds and only a solid white residue remained after the flame expired.

Nitromethane alone when subjected to the same test under essentially the same conditions did not burn at all.

I claim:
1. A composition consisting essentially of (1) from about 20 to about 60 weight percent of a nitroalkane having from 1 to 5 carbon atoms in the alkyl group, (2) from about 5 to about 30 weight percent of an ether having the formula:

R—O—R' wherein R and R' are each selected from the class consisting of alkyl radicals having from 1 to 4 carbon atoms and alkoxyalkyl groups having from 1 to 4 carbon atoms in each of the alkyl and alkoxy portions of said groups, and (3) from about 30 to about 60 weight percent of an inorganic perchlorate that is soluble in the nitroalkane-ether mixture.

2. A composition as in claim 1 wherein the nitroalkane is nitromethane.

3. A composition as in claim 1 wherein the nitroalkane is 2-nitropropane.

4. A composition as in claim 1 wherein R and R' are both alkyl groups having from 1 to 4 carbon atoms.

5. A composition as in claim 1 wherein R is an alkyl group having from 1 to 4 carbon atoms and R' is an alkoxyalkyl group having from 1 to 4 carbon atoms in each of the alkyl and alkoxy portions of said group.

6. A composition as in claim 1 wherein both R and R' are alkoxyalkyl groups having from 1 to 4 carbon atoms in each of the alkoxy and alkyl portions of both groups.

7. A composition as in claim 4 wherein the ether is diethyl ether.

8. A composition as in claim 5 wherein the ether is 2,2-dimethoxypropane.

9. A composition as in claim 5 wherein the ether is ethylene glycol dimethyl ether.

10. A composition as in claim 6 wherein the ether is diethylene glycol dimethyl ether.

11. A composition as in claim 1 wherein the perchlorate is magnesium perchlorate.

No references cited.